(Model.)

N. EVINGER.
Vegetable Cutter.

No. 237,844. Patented Feb. 15, 1881.

Witnesses:
Fred G. Dietrich
J. R. Littell

Inventor:
N. Evinger
by C. A. Snow & Co.
Attorneys.

N. PETERS, PHOTO-LITHOGRAPHER, WASHINGTON, D. C.

UNITED STATES PATENT OFFICE.

NOAH EVINGER, OF SANDFORD, INDIANA.

VEGETABLE-CUTTER.

SPECIFICATION forming part of Letters Patent No. 237,844, dated February 15, 1881.

Application filed December 4, 1880. (Model.)

*To all whom it may concern:*

Be it known that I, NOAH EVINGER, of Sandford, in the county of Vigo and State of Indiana, have invented certain new and useful Improvements in Vegetable-Cutters; and I do hereby declare that the following is a full, clear, and exact description of the invention, which will enable others skilled in the art to which it appertains to make and use the same, reference being had to the accompanying drawings, which form a part of this specification.

Figure 1:
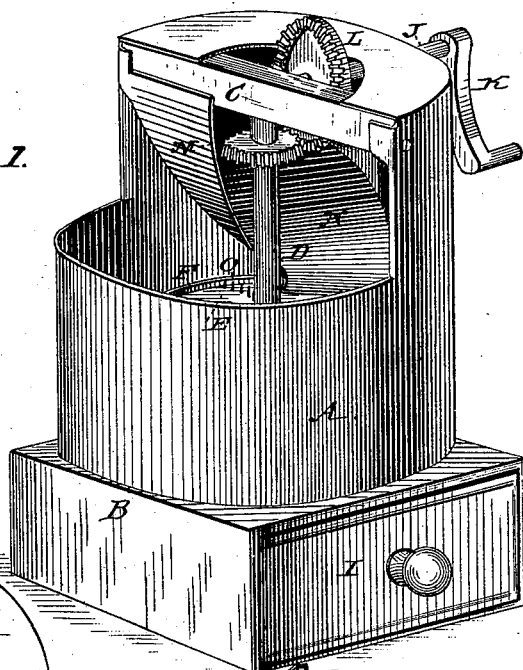
Figure 3:
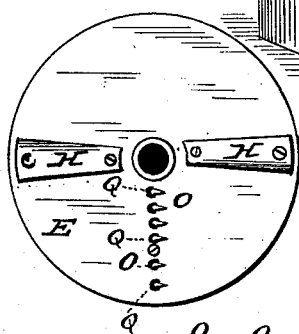
Figure 2:
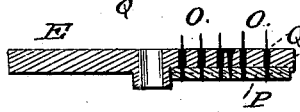
Figure 2:
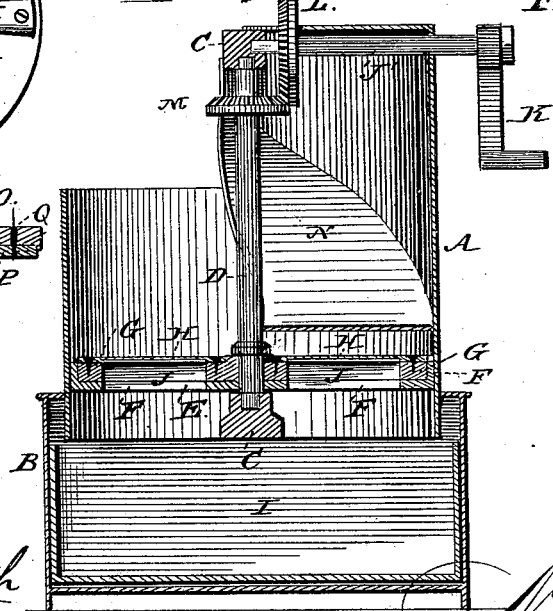

Figure 1 is a perspective view. Fig. 2 is a vertical sectional view, and Fig. 3 is a detail view of the cutter-disk detached.

Corresponding parts in the several figures are denoted by like letters of reference.

This invention relates to machines for cutting and slicing vegetables; and it consists in certain improvements in the construction of the same, which will be hereinafter fully described, and particularly pointed out in the claims.

In the drawings hereto annexed, A represents a cylindrical shell, mounted upon a base, B. Transverse cross-bars C extend across the shell or hopper, at the upper and lower ends of the same, to form bearings for a vertical shaft, D, carrying near its lower end a circular disk, E, consisting of a cup or casting, F, in which is secured a wooden or metallic disk, G, provided with a suitable number of radiating knives or cutters, H H, secured to the upper side thereof by means of screws, bolts, or in any other suitable manner, and in a slanting position, like plane-blades, so as to shave or cut slices of the vegetables contained in the shell or hopper. A drawer or other receptacle, I, is arranged in the base B to receive the slices as they pass through slots or openings J in the lower disk, E.

Suitable bearings are provided in the shell A and the upper cross-bar, C, for a horizontal shaft, J', provided with a crank, K, and a bevel-wheel, L, engaging a pinion, M, upon the vertical shaft D, which may thus be rotated by operating crank K.

In the shell or hopper A is arranged a curved shoe, N, by which the vegetables placed in the hopper are fed to the knives and held down against the disk G when the latter is rotated.

Besides the knives or cutters H, the disk G is provided with one or more radial series of detachable vertical cutters, O, by which the vegetables placed in the hopper are cut lengthwise before being sliced, the object being to cut the material into long narrow strips, which, for a variety of purposes, are more desirable than slices. When, however, the latter are desired, the said vertical cutters are to be removed from the disk. To render them thus detachable they are secured upon a rod or bar, P, a suitable distance apart. The disk G is provided with a series of perforations, Q, to receive the cutters, which project upward, the rod or bar P being secured upon the under side of the disk by bolts, screws, or any other suitable means; or, if desired, the cutters may be made adjustable upon the bar P, the disk G being in this case provided with a radial slot or opening for their reception. By this arrangement strips of any desired width may be cut, it being only necessary to adjust the vertical cutters at any desired distance from each other upon the rod or bar P before attaching the latter to the cutter-disk.

From the foregoing description, taken in connection with the drawings hereto annexed, the operation and advantages of my invention will be readily understood.

The heavy metallic portion E serves to give momentum to the disk G when the machine is operated.

The machine is simple, convenient, and easily operated.

Having thus described my invention, I claim and desire to secure by Letters Patent of the United States—

1. In a vegetable-cutter, the combination, with the disk G, having knives H and cutters O, of the horizontally-revolving metallic disk E, having a metallic cup or casting, F, for the reception of the disk G, as and for the purpose herein shown and described.

2. The herein-described vegetable-cutter, composed of the hopper A, having the downwardly-curved feeding-shoe N, and vertical revolving shaft D, having disk E, with metallic cup or casting F secured thereto, and provided with cutting-disk G, and the receiving-receptacle arranged below said hopper A, as specified.

In testimony that I claim the foregoing as my own I have hereto affixed my signature in presence of two witnesses.

NOAH EVINGER.

Witnesses:
JOHN N. WOLF,
GEO. P. BOYER.